United States Patent [19]
Piirainen

[11] Patent Number: 6,075,830
[45] Date of Patent: Jun. 13, 2000

[54] METHOD AND APPARATUS FOR ADAPTING AN ASYNCHRONOUS BUS TO A SYNCHRONOUS CIRCUIT

[75] Inventor: Olli Piirainen, Oulu, Finland

[73] Assignee: Nokia Telecommunications Oy, Espoo, Finland

[21] Appl. No.: 08/973,276

[22] PCT Filed: May 23, 1996

[86] PCT No.: PCT/FI96/00285

§ 371 Date: Nov. 28, 1997

§ 102(e) Date: Nov. 28, 1997

[87] PCT Pub. No.: WO96/38793

PCT Pub. Date: Dec. 5, 1996

[30] Foreign Application Priority Data

May 29, 1995 [FI] Finland ..................... 952614

[51] Int. Cl.⁷ ............... H04L 7/00; G06F 13/00; G06F 13/14; G06F 13/28
[52] U.S. Cl. ............ 375/354; 375/220; 375/370; 375/372; 710/31; 710/61; 710/106; 710/129; 710/130; 713/400; 713/401
[58] Field of Search ................... 375/372, 220, 375/354, 370; 710/61, 106, 306, 309, 31, 130, 129; 713/400, 401

[56] References Cited

U.S. PATENT DOCUMENTS

| | | |
|---|---|---|
| 4,935,942 | 6/1990 | Hwang et al. . |
| 5,070,443 | 12/1991 | Priem et al. . |
| 5,191,657 | 3/1993 | Ludwig et al. ............... 395/325 |
| 5,357,613 | 10/1994 | Cantrell et al. . |
| 5,524,270 | 6/1996 | Haess et al. ............... 395/308 |
| 5,673,398 | 9/1997 | Takeda ............... 395/285 |
| 5,684,841 | 11/1997 | Chiba et al. ............... 375/354 |
| 5,758,188 | 5/1998 | Appelbaum et al. ............... 395/855 |

FOREIGN PATENT DOCUMENTS

| | | |
|---|---|---|
| 279 564 | 8/1988 | European Pat. Off. . |
| 649 097 | 4/1995 | European Pat. Off. . |
| 5-151142 | 6/1993 | Japan . |

Primary Examiner—Stephen Chin
Assistant Examiner—Michael W. Maddox
Attorney, Agent, or Firm—Pillsbury Madison & Sutro Intellectual Property

[57] ABSTRACT

Many digital processors have an asynchronous bus controlled by two control signals. To interface a synchronous memory to an asynchronous bus, interface logic is required. In an interface for transferring data from an asynchronous circuit to a synchronous circuit, data to be written are written in an intermediate register while timing control signals are being synchronized to a system clock by means of flip-flops. Correspondingly, in an interface for transferring data from the synchronous circuit to the asynchronous circuit, a signal indicating a read transaction from the synchronous circuit is synchronized to the system clock by means of a flip-flop circuit.

8 Claims, 2 Drawing Sheets

METHOD AND APPARATUS FOR ADAPTING AN ASYNCHRONOUS BUS TO A SYNCHRONOUS CIRCUIT

This application is the national phase of international application PCT/Fl96/00285, filed May 23, 1996 which designated the U.S.

BACKGROUND OF THE INVENTION

1. Field of the Invention

The present invention relates to an arrangement by which a circuit provided with an asynchronous bus can be adapted to peripheral interface circuits that require a synchronous bus.

2. Description of the Related Art

Many digital processors have an asynchronous bus which is controlled by two timing control signals. An asynchronous bus may cause difficulties in applications that are strict as far as timing is concerned. The libraries of some producers of Application Specific Integrated Circuits (from hereafter "ASIC circuits") also contain synchronous memories only, or using such a memory instead of an asynchronous memory is otherwise feasible. In order to adapt a synchronous memory to an asynchronous bus, interface logic is required.

In many digital processors, such as the AT&T® signal processor DSP1610, the bus is controlled by two timing control signals. In the figures, they are presented as signals ENA' and RWN. State 0 of the signal ENA' (Enable) indicates that the processor carries out either a read or a write transaction. State 0 of the signal RWN (Read/Write-Not) indicates that the processor is writing to peripheral circuits, and state 1 of the same signal indicates that the processor is reading from the peripheral circuits. If ENA' is "1", the state of the signal RWN' is of no importance.

Formerly, digital processors have been coupled to ASIC circuits by applying both of the control signals ENA' and RWN to peripheral circuits. This results in certain drawbacks. First of all, some circuits only have one line to which a timing control signal can be coupled. In addition, the fact that the transitions of the signals ENA' and RWN have not necessarily been synchronized to the system clock (CKO) may cause problems in applications that are critical as far as timing is concerned. Furthermore, some ASIC circuit suppliers only have synchronous memories to offer, which means that it is not possible to employ all existing peripheral interface circuits on an asynchronous bus. In addition, an environment requiring two control signals for timing is rather poorly, or not at all, supported by development tools. Test generation is also facilitated if timing takes place with one control signal.

SUMMARY OF THE INVENTION

The object of the present invention is to obtain methods and arrangements for eliminating the problems and limitations described above. This object is achieved with the methods according to claims 1 and 2, and circuit arrangements according to claims 3 and 4.

BRIEF DESCRIPTION OF THE DRAWINGS

In the following, the invention will be described in closer detail by means of drawings, in which.

DETAILED DESCRIPTION OF PREFERRED EMBODIMENT

Figure 1:
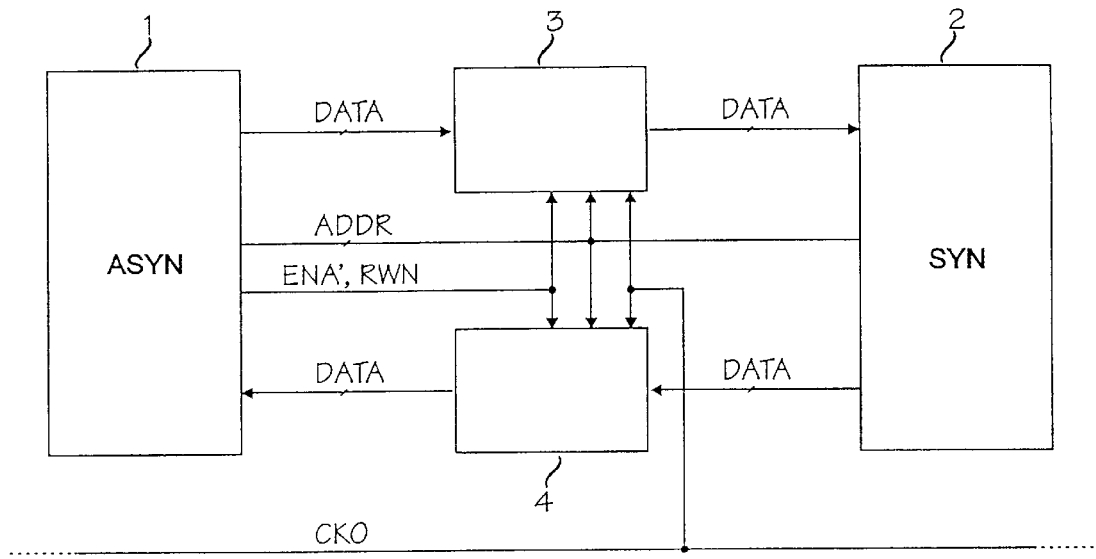
FIG. 1 is a block diagram illustration of adapting interfaces according to the invention.

The positioning of the adapting interfaces of the invention are shown in FIG. 1. Between an asynchronous circuit 1 and a synchronous circuit 2 there is arranged an adapting interface 3, which carries out the transfer of data (DATA) from the asynchronous circuit 1 to the synchronous circuit 2, and an adapting interface 4 which carries out the transfer of data in the reverse direction. According to requirements at any one time, one or both adapting interfaces 3 and 4 of the invention can be used.

In the following, the operation of the adapting interface 3 of the invention is examined on the basis of FIG. 2 and the associated pulse diagram 3. The figures present the blocks that are essential to the invention: the asynchronous circuit 1 (e.g. a digital signal processor), the synchronous circuit 2 and the adapting interface 3 in accordance with the invention. In the pulse diagram 3, it is assumed that the write transaction employs a wait state WS and that there is one NOP (No Operation) instruction between two write transactions. In the figures, it is further assumed, without limiting the scope of the invention in any way, that the address bus ADDR of the asynchronous circuit 1 is used to address the whole synchronous memory, which means that at least some bits of the address bus ADDR are used as chip select CS signals for an address comparator EL (Enable Logic). The output of the block EL is "1" in case the most significant bits—equal in number to the width of the address comparator in bits—of the address on the address bus ADDR equal the reference address arranged in the block EL. The figure does not show the design of the address comparator but it is clear that the circuit can be formed of comparator circuits each of which compare one bit on the address bus to a reference value which can be set e.g. by means of adjustable jumper means. The function of the blocks EL and A-DEC is distributed so that the block EL detects that the operation is addressed to the circuit of FIG. 2, and the block A-DEC distributes the signal WE' within the circuit of FIG. 2. Regarding FIGS. 2 and 4, it is assumed that the memory address is generated by a peripheral circuit which uses the same clock signal CKO as the other synchronous circuits; therefore, generating the memory address in not disclosed herein. The circuit generating the memory address may be an autoincrement counter or some other suitable circuit. As far as the present invention is concerned, it is also insignificant where the clock signal CKO is generated.

Figure 2:
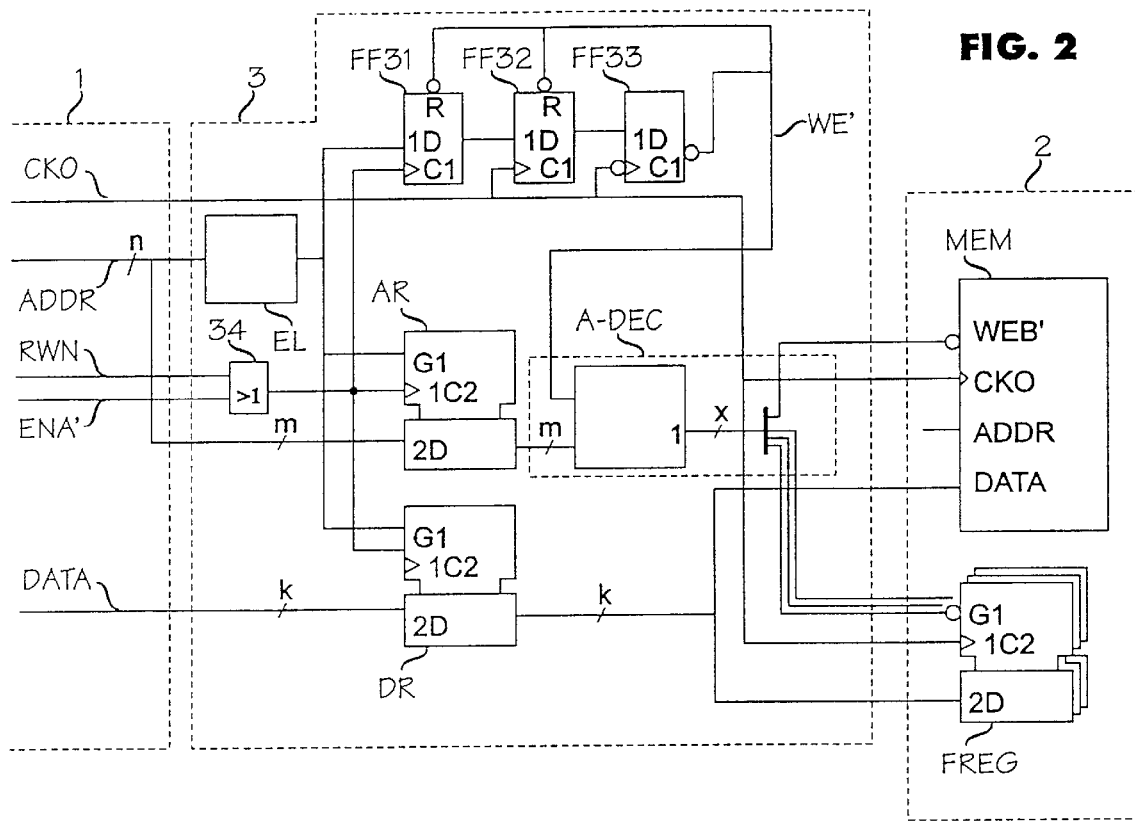
FIG. 2 illustrates an adapting interface of the invention for transferring data from an asynchronous circuit to a synchronous circuit.
Figure 3:
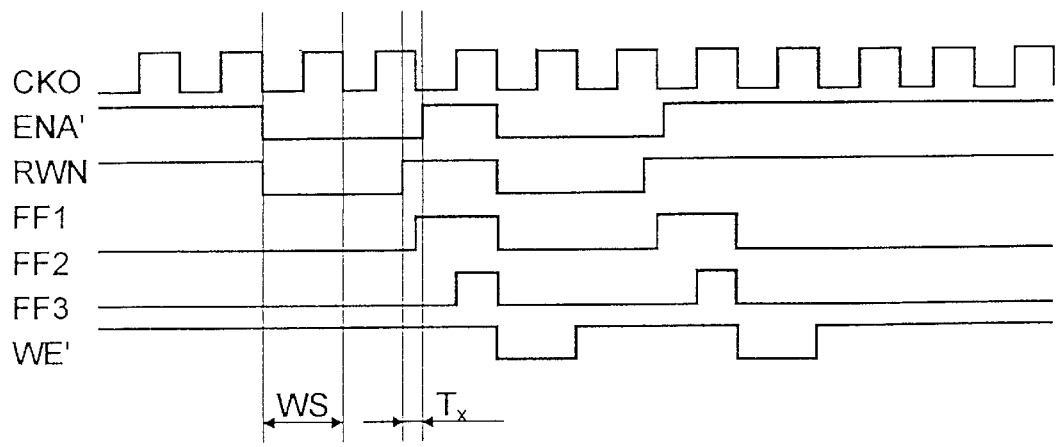
FIG. 3 shows an impulse diagram in a circuit corresponding to FIG. 2.

Referring to FIGS. 2 and 3, the write cycle of the interface logic according to the invention takes place in the following steps:

1. The switching means 34 detects the moment when at least one of the signals ENA' and RWN (in this example, RWN) changes to "1". If the contents of the address bus simultaneously equal the reference address arranged in the address comparator EL, the data (DATA) are written into an intermediate register DR and the value "1" is written into a flip-flop FF31;

2. On the subsequent rising edge of the clock signal CKO, the value "1" is transferred to the subsequent flip-flop FF32.

3. On the subsequent falling edge of the clock signal CKO, the value "1" is transferred to the subsequent flip-flop FF33. At the same moment, the signal WE' (Write Enable) which is active in state 0 is set to 0. This signal is utilized both for allowing the write transactions to the synchronous memory MEM and functional registers FREG and for resetting the two preceding flip-flops FF31, FF32. The address decoder A-DEC inside the circuit distributes the signal WE' for the circuit section determined by the address bus. In case the -write transaction is addressed to the memory, a signal WEB' is produced by the A-DEC to the memory, the WEB' signal being applied to the memory MEM.

4. On the subsequent rising edge of the clock signal CKO, the data on the data bus are written into the memory or the registers.

5. On the subsequent falling edge of the clock signal CKO, the signal WE' is restored to "1", making the interface ready for the following cycle.

From the pulse diagram 3 illustrating the write transactions tQ the memory or register, a moment $T_x$ critical to the timing can be seen; if the signal RWN rises to 1 before the signal ENA', as in FIG. 3, a transient situation will arise in which the circuit appears to be carrying out a read transaction. What takes place in practice depends on the timing tolerances of the components and on other parameters of the design. As can be seen, such a transient is not present in a signal WE' generated by the circuit according to the invention.

Figure 4:
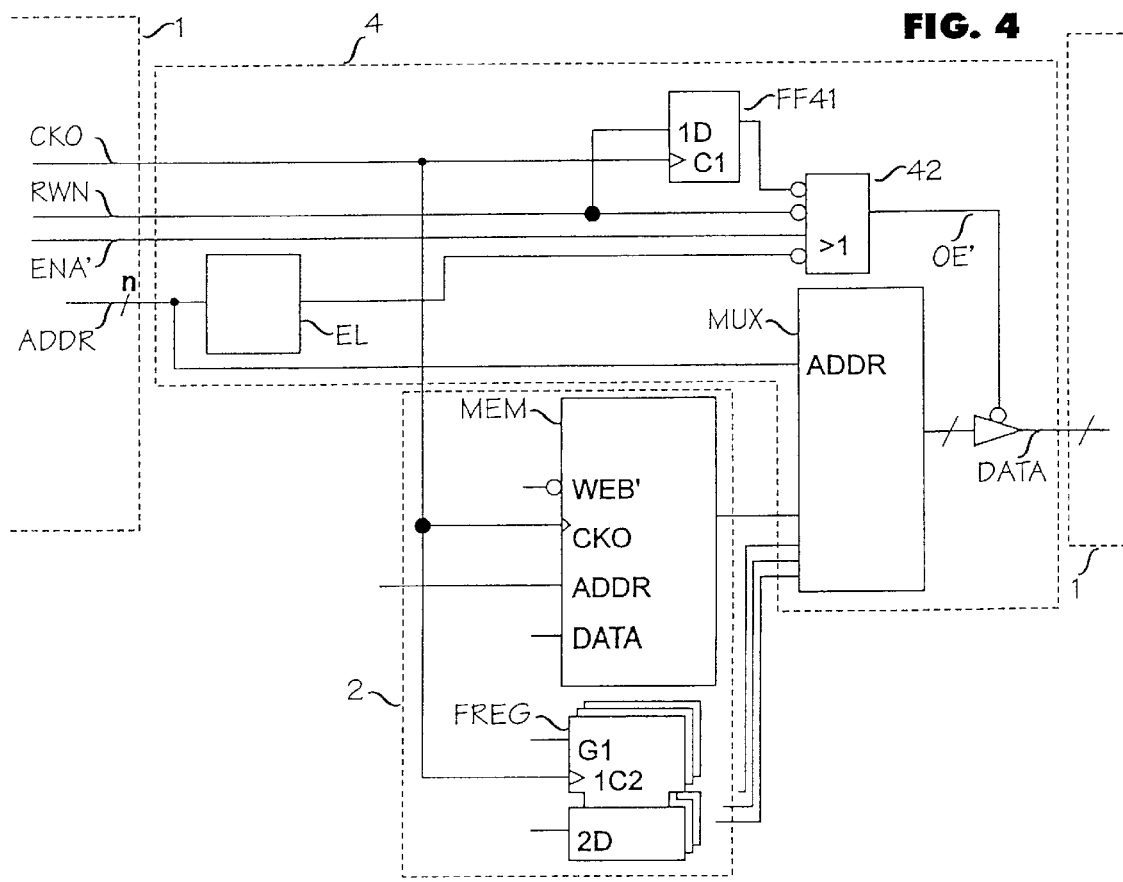
FIG. 4 illustrates an adapting interface of the invention for transferring data from a synchronous circuit to an-asynchronous circuit.

A read transaction can be performed as illustrated in FIG. 4. On the basis of the above description on write transactions it can be noted that the synchronization of signals ENA' and RWN to the system clock CKO takes place by means of a flip-flop FF41 and a comparator means 42. If the circuit employs a memory, and a signal OE' (Output Enable) is required for calculating the memory address, the signal can be synchronized to the clock signal CKO. This means that the synchronized signal OE' could be utilized as an ordinary data input for a memory address calculating unit. Other solutions suitable to the application may be employed.

The advantage of the invention described above by means of its preferred embodiment is that only one timing control signal is required for the functional registers. As far as timing is concerned, the circuit arrangement of the invention is less sensitive to delays and other parameters of the design than asynchronous circuits. In addition, even such ASIC circuits that cannot directly be coupled to an asynchronous bus can be coupled to the processor.

What is claimed is:

1. A method for transferring data from an asynchronous circuit to registers of a synchronous circuit, into a location determined by an address, in a system which comprises a system clock and in which the asynchronous circuit comprises at least a first signal indicating data transfer and a second signal indicating a direction of the data transfer, and the system further comprises a synchronization block for synchronizing the first and the second signals into the system clock, the method comprising:

writing the data under control of the asynchronous circuit to a first intermediate register and setting the synchronization block when the first signal indicating the data transfer is active and the second signal indicative of the direction of the data transfer indicates the data transfer from the asynchronous circuit to the synchronous circuit;

writing the address, simultaneously with the writing of the data, into a second intermediate register; and controlling writing of the data into the registers of the synchronous circuit by the synchronization block.

2. The method of claim 1, wherein an operation of the synchronization block comprises:

setting a first switch and writing data into the first intermediate register and the address into the second intermediate register, in response to the first signal indicating the data transfer being active and in response to the second signal indicating the direction of the data transfer being from the asynchronous circuit to the synchronous circuit;

setting a second switch at a subsequent state transition of the system clock in response to the first switch being set;

setting a third switch at a subsequent state transition of the system clock in response to the second switch being set; and writing the data from the first intermediate register to the synchronous circuit and resetting the first switch and the second switch at a subsequent state transition of the system clock in response to the third switch being set.

3. A method for transferring data from a synchronous circuit to an asynchronous circuit in a system which comprises a system clock and in which the asynchronous circuit comprises at least a first signal indicating data transfer and a second signal indicating a direction of the data transfer, the method comprising:

setting a switch at a subsequent state transition of the system clock in response to the second signal indicating the direction of the data transfer being from the synchronous circuit to the asynchronous circuit; and transferring the data from the synchronous circuit to the asynchronous circuit in response to the switch being set, the first signal being active, and the second signal indicating the direction of the data transfer being from the synchronous circuit to the asynchronous circuit.

4. An apparatus for transferring data from an asynchronous circuit to at least one of memory locations and registers of a synchronous circuit, into a location determined by an address, in a system which comprises a system clock and in which the asynchronous circuit comprises at least a first signal indicating data transfer and a second signal indicating a direction of the data transfer, the system further comprising a synchronization block for synchronizing the first and the second signals with the system clock, the apparatus comprising:

a first intermediate register with support circuits for temporary storing of the data in response to the first signal indicating the data transfer being active and the second signal indicating the direction of the data transfer from the asynchronous circuit to the synchronous circuit; and a second intermediate register for temporary storing of the address, the second intermediate register being simultaneously controlled with the support circuits with the temporary storing of the data;

the synchronization block being arranged to synchronize writing of the data from the first intermediate register to at least one of several different memory locations and the registers of the synchronous circuit.

5. An apparatus for transferring data from a synchronous circuit to an asynchronous circuit in a system which comprises a system clock and in which the asynchronous circuit comprises at least a first signal indicative of a data transfer and a second signal indicative of a direction of the data transfer, the apparatus comprising:

a first switch being set at a next state transition of the system clock in response to the second signal indicating the direction of the data transfer being from the synchronous circuit to the asynchronous circuit; and a second switch for transferring the data from the synchronous circuit to the asynchronous circuit in response to the first switch being set, the first signal indicating the data transfer being simultaneously active, and the second signal indicating the direction of the data transfer being from the synchronous circuit to the asynchronous circuit.

6. A method as claimed in claim 1, wherein any one of the acts are responsive to contents of an address bus equaling corresponding bits of a reference address arranged in an address comparator.

7. An apparatus as claimed in claim 4, further comprising an address comparator coupled to an address bus, and to which at least one of the synchronization block and the first intermediate register is responsive.

8. A method as claimed in claim 2, wherein any one of the acts are responsive to contents of an address bus equaling corresponding bits of a reference address arranged in an address comparator.

* * * * *